(12) United States Patent
Wang et al.

(10) Patent No.: US 10,996,483 B1
(45) Date of Patent: May 4, 2021

(54) STRUCTURED LIGHT PROJECTOR AND METHOD FOR STRUCTURED LIGHT PROJECTION USING THE SAME

(71) Applicant: HIMAX TECHNOLOGIES LIMITED, Tainan (TW)

(72) Inventors: Ching-Wen Wang, Tainan (TW); Cheng-Che Tsai, Tainan (TW); Wu-Feng Chen, Tainan (TW); Yi-Hsiu Lin, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/726,809

(22) Filed: Dec. 24, 2019

(51) Int. Cl.
*G02B 27/42* (2006.01)
*G06T 5/00* (2006.01)
*G01B 11/25* (2006.01)

(52) U.S. Cl.
CPC ...... *G02B 27/4222* (2013.01); *G01B 11/2513* (2013.01); *G06T 5/005* (2013.01)

(58) Field of Classification Search
CPC .. G02B 27/4222; G01B 11/2513; G06T 5/005

USPC ......................................... 356/600–640, 250
See application file for complete search history.

(56) References Cited

U.S. PATENT DOCUMENTS

| | | | |
|---|---|---|---|
| 2012/0307260 A1* | 12/2012 | Keshavmurthy | .. G01B 11/2518 356/610 |
| 2018/0160101 A1 | 6/2018 | Price et al. | |
| 2019/0005664 A1 | 1/2019 | Zhao et al. | |

* cited by examiner

*Primary Examiner* — Tri T Ton
(74) *Attorney, Agent, or Firm* — CKC & Partners Co., LLC (57) ABSTRACT

A structured light projector and a method for structured light projection are disclosed. The structured light projector includes a projection module, an image sensor and a processor. The projection module is configured to project an optical pattern onto a region of space. The image sensor is configured to capture an image by detecting the optical pattern projected onto the region of space. The processor is configured to calculate disparity information of the optical pattern projected onto the region of space from the captured image, and is configured to compensate for the disparity of depending on an environment temperature of the projection module.

11 Claims, 8 Drawing Sheets

| Y \ X | X1 | X2 |
|---|---|---|
| Y1 | $C_{T1}(X1,Y1)$ | $C_{T1}(X2,Y1)$ |
| Y2 | $C_{T1}(X1,Y2)$ | $C_{T1}(X2,Y2)$ |

FIG. 7A

| Y \ X | X1 | X2 |
|---|---|---|
| Y1 | $C_{T2}(X1,Y1)$ | $C_{T2}(X2,Y1)$ |
| Y2 | $C_{T2}(X1,Y2)$ | $C_{T2}(X2,Y2)$ |

FIG. 7B

| X \ Y | 1 | 2 | 3 | ... | M-2 | M-1 | M |
|---|---|---|---|---|---|---|---|
| 1 | $C_{T1}(1,1)$ | $C_{T1}(2,1)$ | $C_{T1}(3,1)$ | ... | $C_{T1}(M-2,1)$ | $C_{T1}(M-1,1)$ | $C_{T1}(M,1)$ |
| 2 | $C_{T1}(1,2)$ | $C_{T1}(2,2)$ | $C_{T1}(3,2)$ | ... | $C_{T1}(M-2,2)$ | $C_{T1}(M-1,2)$ | $C_{T1}(M,2)$ |
| 3 | $C_{T1}(1,3)$ | $C_{T1}(2,3)$ | $C_{T1}(3,3)$ | ... | $C_{T1}(M-2,3)$ | $C_{T1}(M-1,3)$ | $C_{T1}(M,3)$ |
| ... | ... | ... | ... | ... | ... | ... | ... |
| N-2 | $C_{T1}(1,N-2)$ | $C_{T1}(2,N-2)$ | $C_{T1}(3,N-2)$ | ... | $C_{T1}(M-2,N-2)$ | $C_{T1}(M-1,N-2)$ | $C_{T1}(M,N-2)$ |
| N-1 | $C_{T1}(1,N-1)$ | $C_{T1}(2,N-1)$ | $C_{T1}(3,N-1)$ | ... | $C_{T1}(M-2,N-1)$ | $C_{T1}(M-1,N-1)$ | $C_{T1}(M,N-1)$ |
| N | $C_{T1}(1,N)$ | $C_{T1}(2,N)$ | $C_{T1}(3,N)$ | ... | $C_{T1}(M-2,N)$ | $C_{T1}(M-1,N)$ | $C_{T1}(M,N)$ |

FIG. 7C

STRUCTURED LIGHT PROJECTOR AND METHOD FOR STRUCTURED LIGHT PROJECTION USING THE SAME

BACKGROUND

Technical Field

The invention relates to structured light projection, and more particularly to a structured light projector with a temperature compensation function and a method for structured light projection using the same.

Description of Related Art

Structured light scanning is a technology to calculate the depths of a field of view. The depth of an object can be calculated by analyzing the captured image. On the other hand, a conventional structured light projector usually produces a special speckle optical pattern by using an infrared laser source to combine the diffractive optical elements. However, the wavelength of the optical pattern generated by a conventional laser element would change due to different temperatures, so that projected speckles of the optical pattern projected onto a region of space expand opposite the center of the region of space after passing through a diffractive optical element (DOE). For a structured light 3D sensor that uses deformation displacements to calculate depth information, the speckles expansion would result in tilt deviation in depth measurement results.

SUMMARY

One objective of the invention is to provide a structured light projector with a temperature compensation function for compensating the expansion of projected speckles due to temperature variation, so as to obtain the depth information of an object more accurately. Another objective of the invention is to provide a method for structured light projection using the structured light projector.

One aspect of the invention relates to a structured light projector which includes a projection module, an image sensor and a processor. The projection module is configured to project an optical pattern onto a region of space. The image sensor is configured to capture an image by detecting the optical pattern projected onto the region of space. The processor is configured to calculate disparity information of the optical pattern projected onto the region of space from the captured image, and is configured to compensate for the disparity information of the depth information depending on an environment temperature of the projection module.

In one or more embodiments, the structured light projector further includes a temperature sensor that is configured to detect the environment temperature of the projection module.

In one or more embodiments, the structured light projector further includes a depth processing module, a microcontroller unit (MCU) and a temperature compensator. The depth processing module is configured to receive the captured image from the image sensor, calculate depth values from locations at which the optical pattern projects, and calculate a distance between the image sensor and the region of space. The microcontroller unit is configured to refer to a look-up table to obtain compensation values corresponding to particular points of the region of space. The temperature compensator is configured to use the compensation values to compensate for the calculated depth values to obtain compensated depth values.

In one or more embodiments, the compensation values includes corner compensation values respectively corresponding to four corner points of the region of space at which the optical pattern is projected.

In one or more embodiments, the processor is configured to perform linear interpolation for compensating the disparity of the depth information for all pixels of the projected optical pattern by using the corner compensation values.

In one or more embodiments, the compensation values in the look-up table are dependent from temperature.

In one or more embodiments, a size of the look-up table is determined by a resolution of the optical pattern.

In one or more embodiments, the structured light projector further includes a memory that is configured to store the look-up table.

In one or more embodiments, the projection module includes a light source and a diffractive optical element (DOE). The light source is configured to generate a light beam. The DOE is configured to convert the light beam into the optical pattern.

In one or more embodiments, the light source is an infrared laser source.

In one or more embodiments, the structured light projector further includes a wafer-level optics (WLO) that is interposed between the light source and the DOE.

Another aspect of the invention relates to a method for structured light projection. The method includes providing a projection module to project an optical pattern onto a region of space; utilizing an image sensor to detect the optical pattern projected onto the region of space; calculating depth information from the optical pattern detected by the image sensor; and compensating an disparity of the depth information depending on an environment temperature of the projection module.

BRIEF DESCRIPTION OF THE DRAWINGS

Embodiments and advantages thereof can be more fully understood by reading the following description with reference made to the accompanying drawings as follows.

DETAILED DESCRIPTION

The spirit of the disclosure is clearly described hereinafter accompanying with the drawings and detailed descriptions. After realizing preferred embodiments of the disclosure, any persons having ordinary skill in the art may make various modifications and changes according to the techniques taught in the disclosure without departing from the spirit and scope of the disclosure.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

The document may repeat reference numerals and/or letters in the various examples. This repetition is for the purpose of simplicity and clarity and does not in itself dictate a relationship between the various embodiments and/or configurations discussed.

Figure 1:
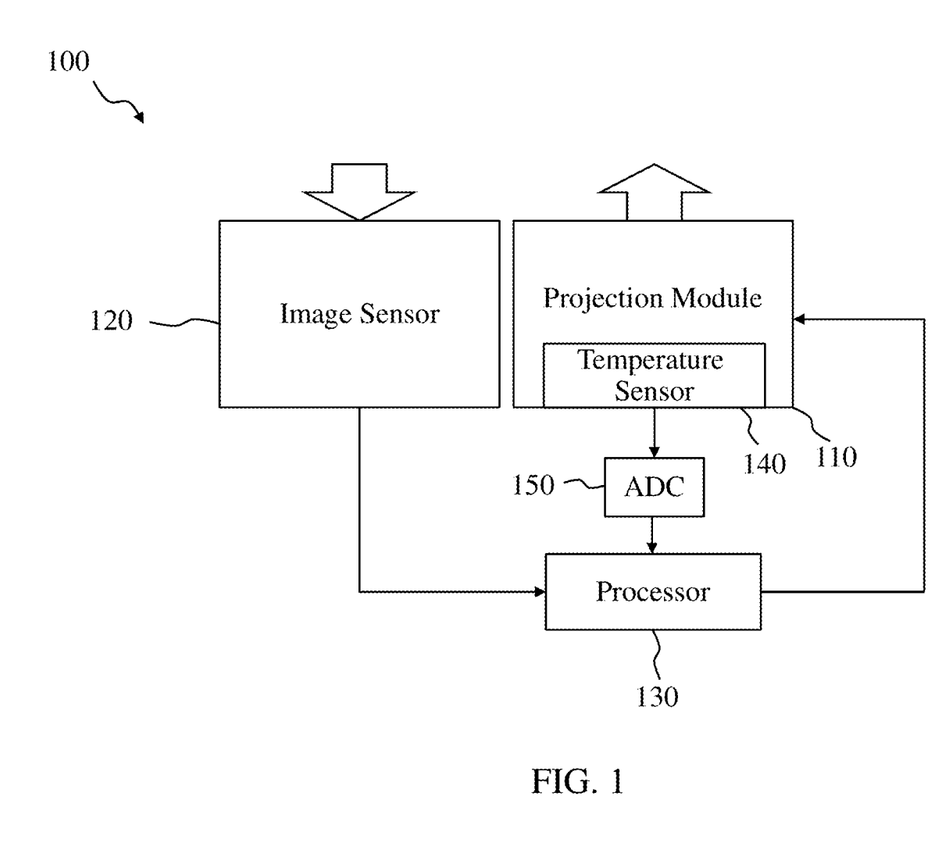
FIG. 1 is schematic diagram of a structured light projector in accordance with one embodiment of the invention.

FIG. 1 is schematic diagram illustrating a structured light projector 100 in accordance with one embodiment of the invention. As shown in FIG. 1, the structured light projector 100 includes a projection module 110, an image sensor 120 and a processor 130 that is electrically connected to the projection module 110 and the image sensor 120.

The projection module 110 is configured to project an optical pattern which may include one or plural dots and/or lines, but the invention is not limited thereto. The image sensor 120 is configured to detect the optical pattern onto the region of space for capturing an image corresponding to the optical pattern. The image sensor 120 may be a charge-coupled device (CCD) sensor, a complementary metal-oxide semiconductor (CMOS) sensor, or the like.

The processor 130 is configured to control the projection module 110. Particularly, the processor 130 transmits a control signal to the projection module 110 for controlling the projection module 110 to project a desired optical pattern. The processor 130 may dynamically control the projection module 110 depending on the captured image from the image sensor 120, and may communicate with the projection module 110 and/or the image sensor 120 through one or more inter integrated circuit (I2C) interfaces, but the invention is not limited thereto. The processor 130 may be a central processing unit (CPU), a microprocessor, a microcontroller, a digital signal processor, an image processing chip, an application-specific integrated circuit, or the like.

The structured light projector 100 also includes a temperature sensor 140 that is configured to detect an environment temperature of the projection module 110. The temperature sensor 140 may be embedded in the projection module 110 for accurately obtaining the environment temperature.

The structured light projector 100 also includes an analog-to-digital converter (ADC) 150 that is electrically connected to the processor 130 and the temperature sensor 140. The ADC 150 is configured to convert the temperature signal corresponding to the environment temperature detected by the temperature sensor 140 from analog to digital.

Figure 2:
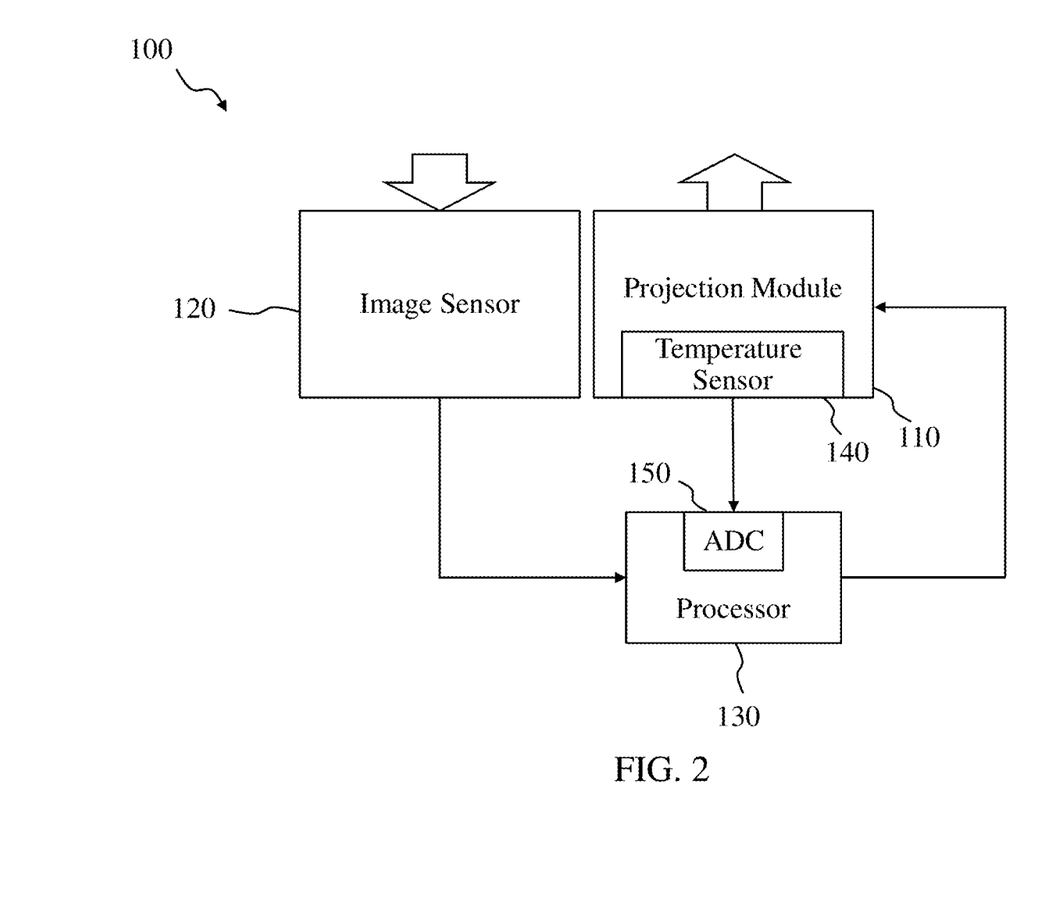
FIG. 2 is schematic diagram of a structured light projector in accordance with another embodiment of the invention.

FIG. 2 is schematic diagram illustrating a structured light projector 100 in accordance with another embodiment of the invention. In FIG. 2, the ADC 150 is physically separated from the processor 130, i.e., not embedded in the processor 130. The other components are the same as those shown in FIG. 1, and thus the detailed description is not repeated herein.

Figure 3:
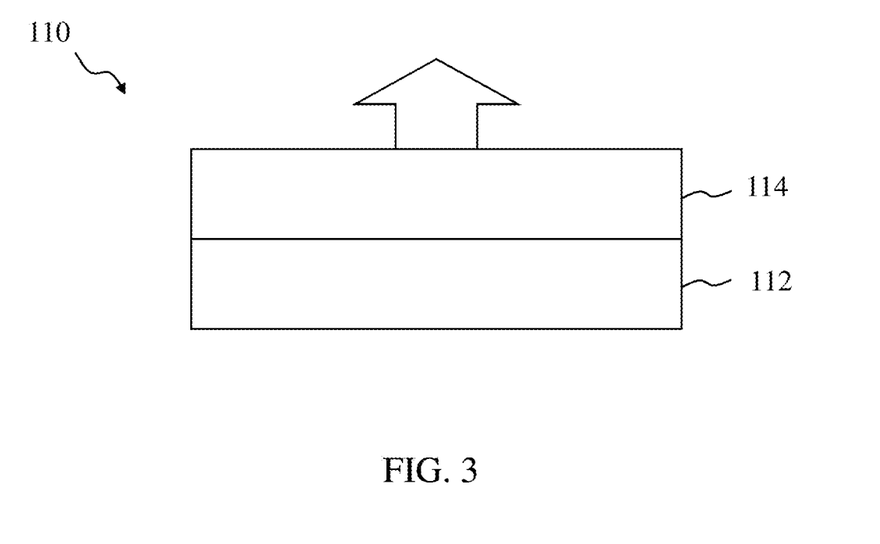
FIG. 3 is schematic diagram of the projection module of the structured light projector in FIG. 1 in accordance with one exemplarily example.

FIG. 3 is schematic diagram of the projection module 110 in accordance with one exemplarily example. As shown in FIG. 3, the projection module 110 includes a light source 112 and a diffractive optical element (DOE) 114. The light source 112 is configured to generate a light beam. The light source 112 may be a laser source, such as vertical cavity surface emitting laser (VCSEL), a distributed feedback (DFB) semiconductor laser, or another suitable light source. The light beam emitted by the light source 112 may be a near-infrared light beam of which the wavelength is in a range from about 700 nm to about 1000 nm. In other embodiments, the light beam emitted by the light source 112 may also be visible, or alternatively the wavelength of the light beam emitted by the light source 112 is in a visible range of about 400-700 nm. The DOE 114 is disposed over the light source 112 for converting the light beam into the optical pattern. In particular, the DOE 114 has a grating structure, such that when the light beam passes through the DOE 114, the light beam is converted to the optical pattern by the diffraction principle of the grating structure.

Figure 4:
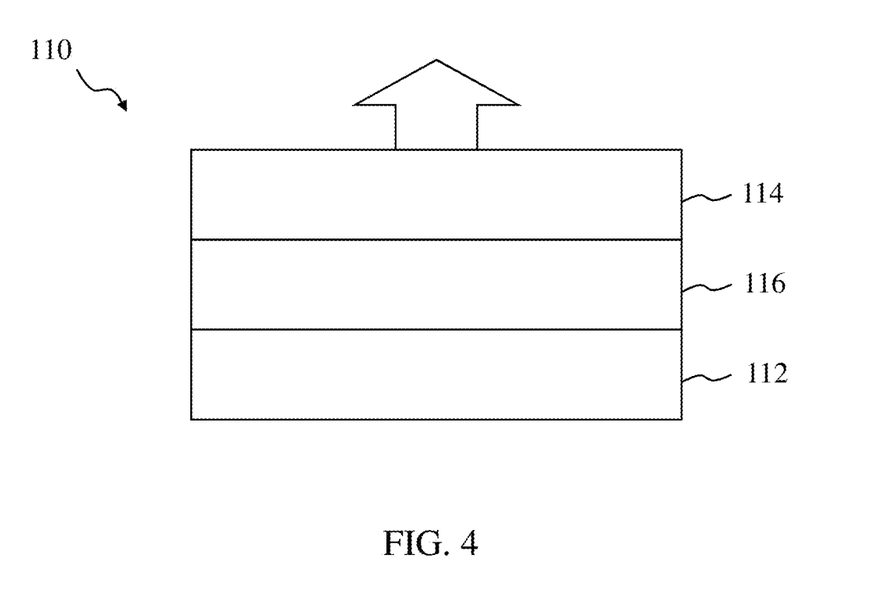
FIG. 4 is schematic diagram of the projection module of the structured light projector in FIG. 1 in accordance with another exemplarily example.

FIG. 4 is schematic diagram of the projection module 110 in accordance with another exemplarily example. In comparison with the projection module 110 shown in FIG. 3, in FIG. 4, the projection module 110 further has a wafer-level optics (WLO) 116 that is interposed between the light source 112 and the DOE 114. The WLO 116 may include one or more substrates on which a beam homogenizer and a collection lens are formed; the beam homogenizer is configured to enlarge the cross-sectional area of the light beam, so that the cross-sectional area of the light beam can cover the following components, while the collection lens is configured to collimate the light beam into parallel light and directs the light beam in a substantially parallel fashion. The other components are the same as those shown in FIG. 3, and thus the detailed description is not repeated herein.

It is noted that FIGS. 3 and 4 are merely examples of the projection module 110. The components of the projection module 110 may have another arrangement in other embodiments. For example, one or more components of the projection module 110 may be omitted or arranged in a different sequence. In addition, the collection lens of the WLO 116 may be a convex lens, a concave lens, a combination thereof, or another suitable lens. In some embodiments, a further projection lens (not shown) may be disposed over the DOE 114 for directing the optical pattern towards the region of space.

Figure 5:
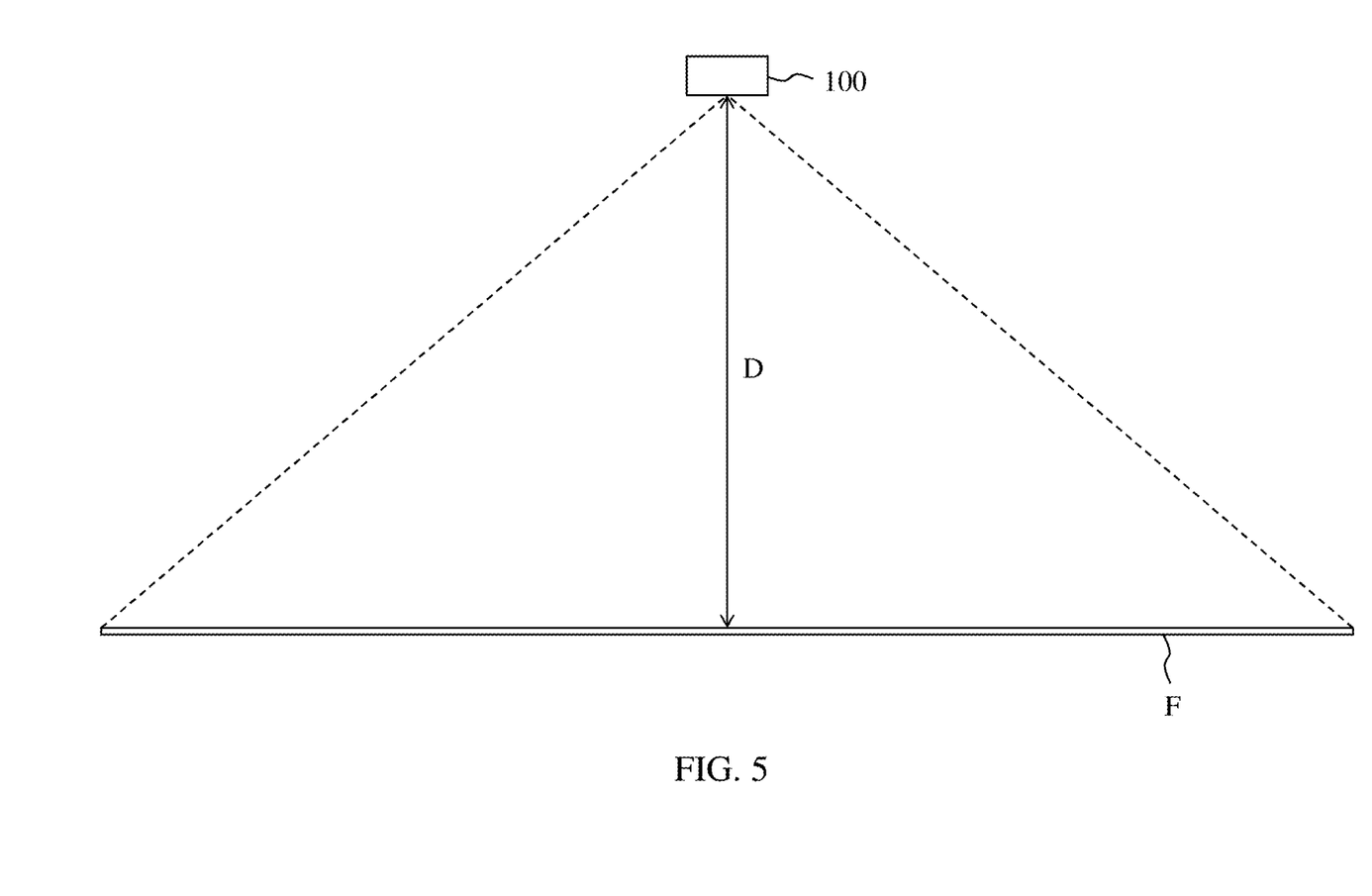
FIG. 5 exemplarily illustrates using the structured light projector in FIG. 1 to measure depth information of a scatter flat plane.

FIG. 5 exemplarily illustrates using the structured light projector 100 to measure depth information of a scatter flat plane F. As shown in FIG. 5, a distance D is between the structured light projector 100 and the scatter flat plane F. Ideally, depth values of the measured depth information corresponding to various points of the scatter flat plane F are all identical to the distance D (suppose that the distance D is also that between the image sensor 120 and the scatter flat plane F). However, the wavelength of the light beam from the projection module 110 would change according to the environment temperature, such that the points of the scatter flat plane F to which the optical pattern is projected would shift due to sparkle expansion, thus causing the processor 130 to obtain inaccurate depth values.

Figure 6:
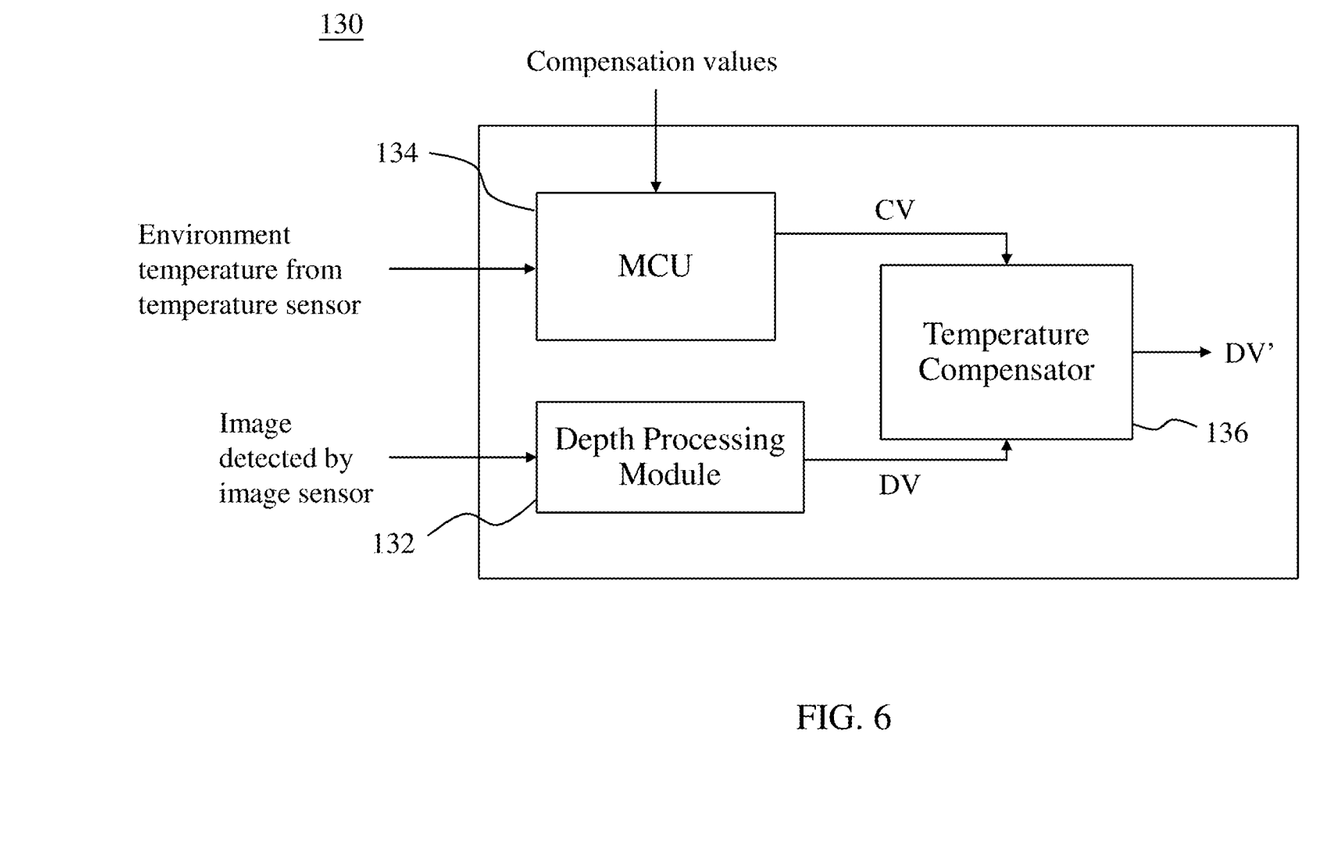
FIG. 6 is a schematic diagram of the processor 130 of the structured light projector in FIG. 1 in accordance with some embodiments.

FIG. 6 is a schematic diagram of the processor 130 in accordance with some embodiments. As shown in FIG. 6, the processor 130 includes a depth processing module 132, a microcontroller unit (MCU) 134 and a temperature compensator 136. The depth processing module 132 receives an image of the region of space captured by the image sensor 120, and calculates depth values DV from the locations at which the optical pattern projects and the distance between the image sensor 120 and the region of space. The MCU 134 refers to a look-up table to obtain compensation values CV corresponding to particular points of the region of space according to the environment temperature detected by the temperature sensor 140. The structured light projector 100 further includes a memory (not shown) that is configured to store the look-up table. The ADC 150 may be electrically connected between the temperature sensor 140 and the MCU 134, such that the MCU 134 uses the digitalized temperature signal to obtain corresponding compensation values CV. The temperature compensator 136 receives the calculated depth values DV from the depth processing module 132 and the compensation values CV from the MCU 134, and uses the compensation values CV to compensate for the calculated depth values DV to obtain compensated depth values DV'. In particular, the temperature compensator 136 first converts the depth values DV into disparity values DP by the equation DP=DS f/DV, where DS is the distance between the projection module 110 and the image sensor 120, and f is the focal length of the image sensor 120. Then, the temperature compensator 136 adds the disparity values DP respectively with the compensation values CV to obtain disparity values DP' (i.e. DP'=DP+CV). After the above compensation operation, the temperature compensator 136 converts the disparity values DP' into depth values DV' by the equation DV'=DS× f/DP'.

Figure 7A:
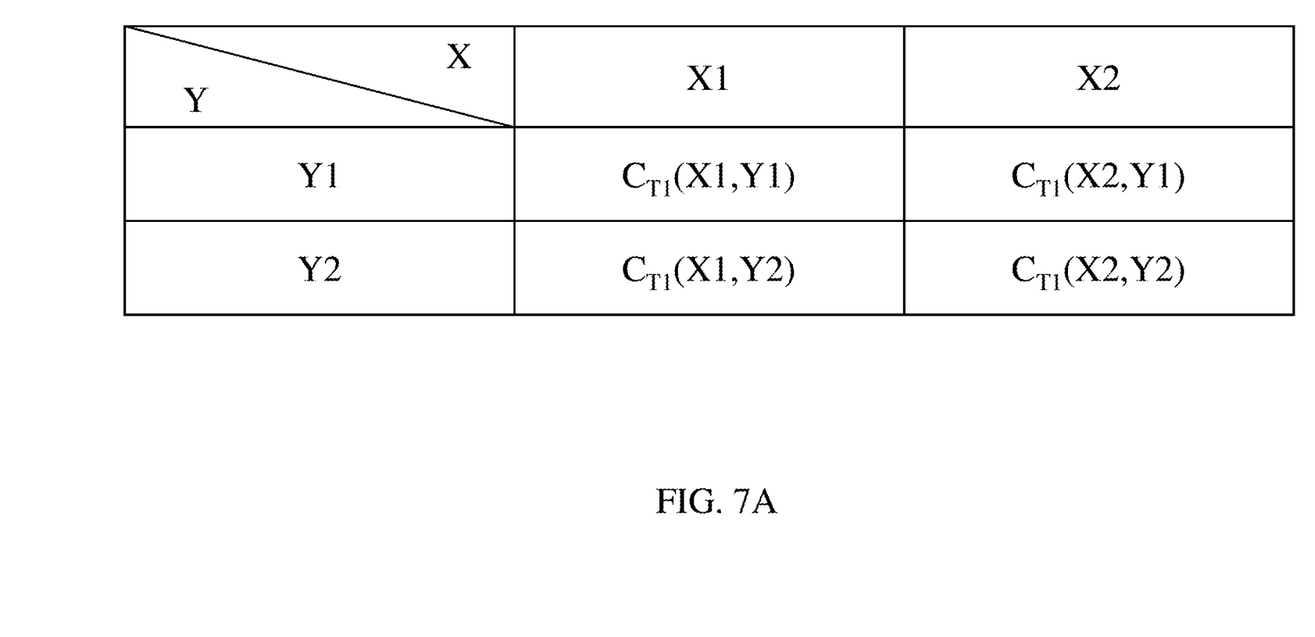
FIGS. 7A-7C illustrates look-up tables stored in accordance with various exemplarily examples.

The look-up table may be dependent from the environment temperature. In some embodiments, two or more look-up tables may be provided, and the MCU 134 selects one of the provided look-up tables depending on the detection result of the temperature sensor 140. For illustration, FIG. 7A illustrates a look-up table stored in accordance with one exemplarily example. The look-up table shown in FIG. 7A corresponds to an environment temperature T1, and includes compensation values corresponding to four corner points of the region of space. The points of the region of space are expressed as coordinates in a two-dimensional coordinate system; e.g., the four corner points of the region of space are represented as (X1,Y1), (X1,Y2), (X2,Y1) and (X2,Y2), respectively. If the temperature sensor 140 detects that the environment temperature is T1, the MCU 134 selects and refers to the look-up table shown in FIG. 7A to obtain the compensation values $C_{T1}(X1,Y1)$, $C_{T1}(X1,Y2)$, $C_{T1}(X2,Y1)$ and $C_{T1}(X2,Y2)$ respectively corresponding to the corner points of the region of space.

In some embodiments, the MCU 134 may perform linear interpolation to obtain the compensation values for the other points of the region of space from the compensation values $C_{T1}(X1,Y1)$, $C_{T1}(X1,Y2)$, $C_{T1}(X2,Y1)$ and $C_{T1}(X2,Y2)$, and then transmits the compensation values to the temperature compensator 136 for compensating the depth information. For example, the compensation value corresponding to the coordinate (X1, Y3) may be obtained from the following equation (where Y1<Y3<Y2):

$$C_{T1}(X1,Y3)=[(Y3-Y1)\times C_{T1}(X1,Y1)+(Y2-Y3)\times C_{T1}(X1,Y2)]/(Y2-Y1).$$

In some embodiments, the MCU 134 may perform non-linear interpolation to obtain the compensation values for the other points of the region of space from the compensation values $C_{T1}(X1,Y1)$, $C_{T1}(X1,Y2)$, $C_{T1}(X2,Y1)$ and $C_{T1}(X2,Y2)$.

Figure 7B:
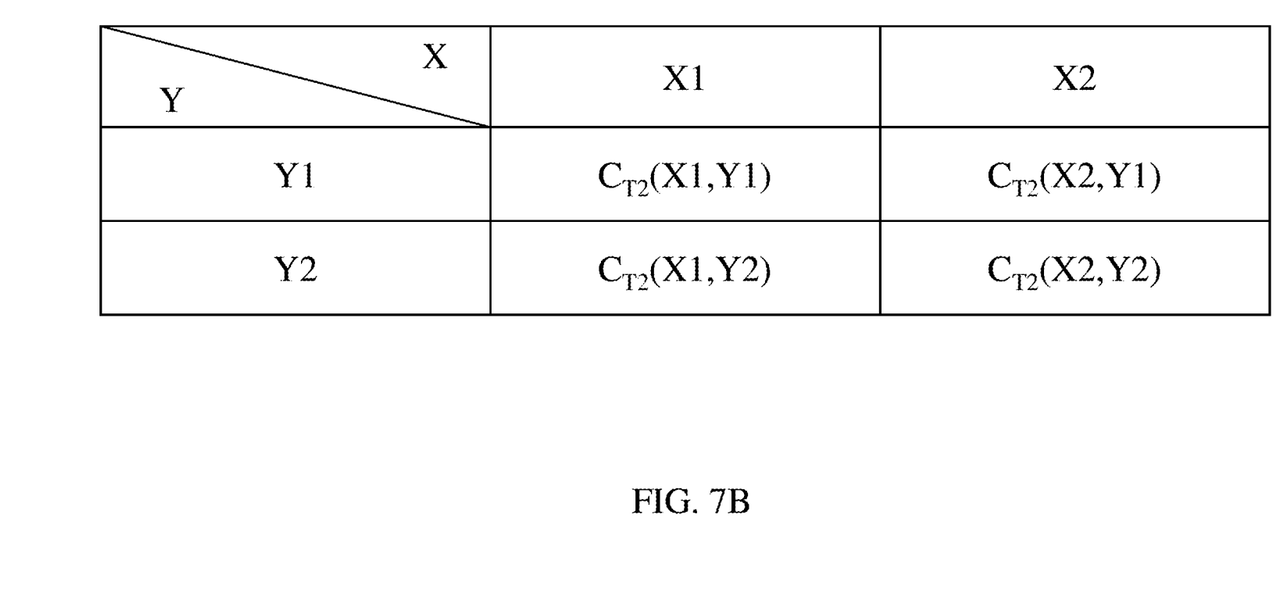

FIG. 7B illustrates another look-up table stored in accordance with one exemplarily example. The look-up table shown in FIG. 7B corresponds to an environment temperature T2, and includes compensation values corresponding to four corner points of the region of space. If the temperature sensor 140 detects that the environment temperature is T2, the MCU 134 selects refers to the look-up table shown in FIG. 7B to obtain the compensation values $C_{T2}(X1,Y1)$, $C_{T2}(X1,Y2)$, $C_{T2}(X2,Y1)$ and $C_{T2}(X2,Y2)$ respectively corresponding to the corner points of the region of space.

Figure 7C:
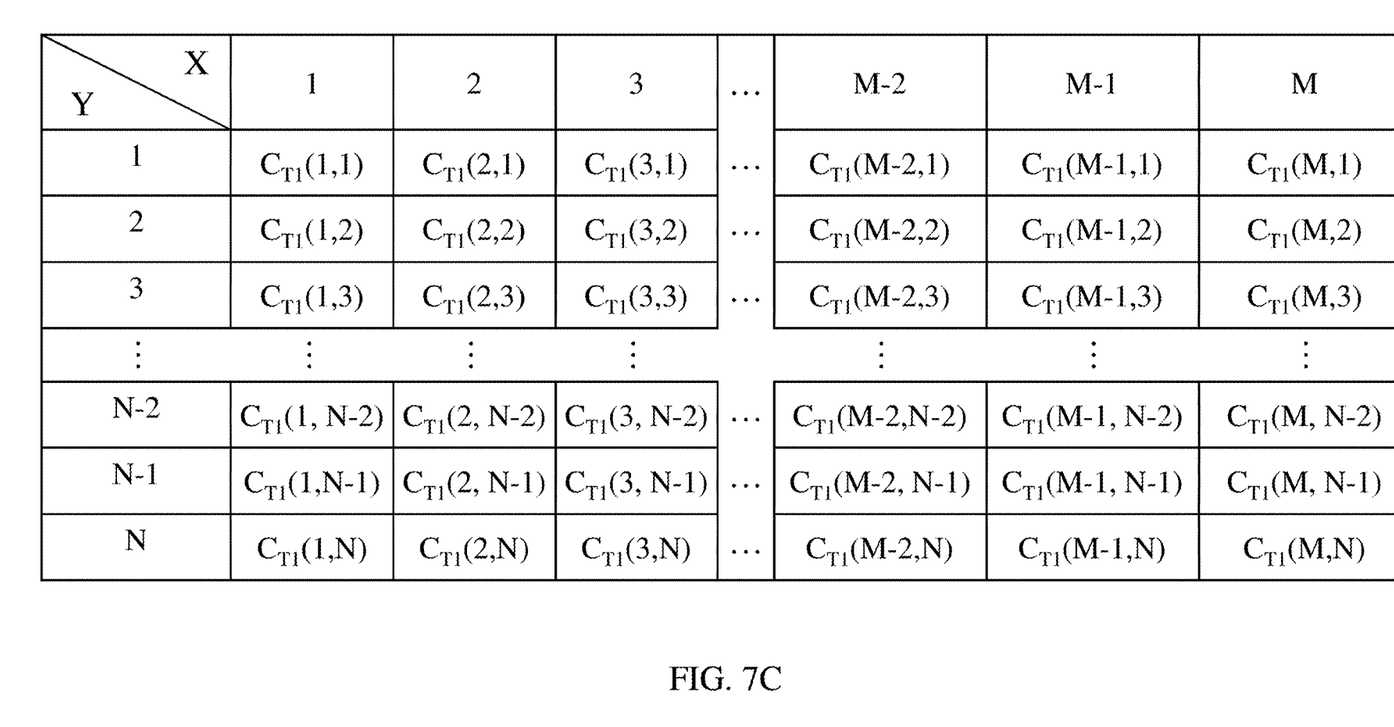

It is noted that the look-up tables may be predetermined by characterizing the coordinates corresponding to points of the region of space in a two-dimensional coordinate system with compensation values for various environment temperatures. In addition, the look-up tables shown in FIGS. 7A-7B are merely examples. The size and the contents thereof may change in accordance with various design requirements. For example, FIG. 7C illustrates another look-up table stored in accordance with one exemplarily example. The look-up table shown in FIG. 7C corresponds to the environment temperature T1. In comparison with the look-up table shown in FIG. 7A, as shown in FIG. 7C, the look-up table includes compensation values respectively corresponding to all of the points of the region of space, and the points of the region of space are expressed as various coordinates in a two-dimensional coordinate system. For the region of space with M×N points, the compensation value $C_{T1}(i,j)$ correspond to the point represented as the coordinate (i,j) in the two-dimensional coordinate system, where i is an integer in a range from 1 to M and j is an integer in a range from 1 to N.

Although the invention is described above by means of the implementation manners, the above description is not intended to limit the invention. A person of ordinary skill in the art can make various variations and modifications without departing from the spirit and scope of the invention, and therefore, the protection scope of the invention is as defined in the appended claims.

What is claimed is:
1. A structured light projector, comprising:
   a projection module configured to project an optical pattern onto a region of space;
   an image sensor configured to capture an image by detecting the optical pattern projected onto the region of space; and
   a processor configured to calculate disparity information of the optical pattern projected onto the region of space from the captured image, and configured to compensate for the disparity information depending on an environment temperature of the projection module, the processor comprising:
   a depth processing module configured to receive the captured image from the image sensor, calculate depth values from locations at which the optical pattern projects, and calculate a distance between the image sensor and the region of space;
   a microcontroller unit (MCU) configured to refer to a look-up table to obtain compensation values corresponding to particular points of the region of space; and
   a temperature compensator configured to use the compensation values to compensate for the calculated depth values to obtain compensated depth values.

2. The structured light projector of claim 1, further comprising:
   a temperature sensor configured to detect the environment temperature of the projection module.

3. The structured light projector of claim 1, wherein the compensation values include corner compensation values respectively corresponding to four corner points of the region of space at which the optical pattern is projected.

4. The structured light projector of claim 3, wherein the processor is configured to perform linear interpolation for compensating the disparity information by using the corner compensation values.

5. The structured light projector of claim 1, wherein the compensation values in the look-up table are dependent from temperature.

6. The structured light projector of claim 1, wherein a size of the look-up table is determined by a resolution of the optical pattern.

7. The structured light projector of claim 1, further comprising:
 a memory configured to store the look-up table.

8. The structured light projector of claim 1, wherein the projection module comprises:
 a light source configured to generate a light beam; and
 a diffractive optical element (DOE) configured to convert the light beam into the optical pattern.

9. The structured light projector of claim 8, wherein the light source is an infrared laser source.

10. The structured light projector of claim 8, further comprising:
 a wafer-level optics (WLO) interposed between the light source and the DOE, the WLO comprising:
 one or more substrates;
 a beam homogenizer formed on the one or more substrates and configured to enlarge a cross-sectional area of the light beam; and
 a collection lens formed on the one or more substrates and configured to collimate the light beam into parallel light and direct the light beam in a substantially parallel fashion.

11. A method for structured light projection, comprising:
 providing a projection module to project an optical pattern onto a region of space;
 utilizing an image sensor to capture an image by detecting the optical pattern projected onto the region of space;
 calculating disparity information of the optical pattern projected onto the region of space from the captured image; and
 compensating for the disparity information depending on an environment temperature of the projection module;
 wherein compensating for the disparity information comprises:
 receiving the captured image from the image sensor, calculating depth values from locations at which the optical pattern projects, and calculating a distance between the image sensor and the region of space;
 referring to a look-up table to obtain compensation values corresponding to particular points of the region of space; and
 using the compensation values to compensate for the calculated depth values to obtain compensated depth values.

* * * * *